US012807414B2

(12) United States Patent
Rami et al.

(10) Patent No.: US 12,807,414 B2
(45) Date of Patent: Nov. 24, 2026

(54) ITEM MANIPULATOR

(71) Applicant: LABEL ELETTRONICA S.R.L., Limena (IT)

(72) Inventors: Enrico Rami, San Giorgio In Bosco (IT); Margherita Rami, Cittadella (IT)

(73) Assignee: LABEL ELETTRONICA S.R.L., Limena (IT)

( * ) Notice: Subject to any disclaimer, the term of this patent is extended or adjusted under 35 U.S.C. 154(b) by 1092 days.

(21) Appl. No.: 17/899,730

(22) Filed: Aug. 31, 2022

(65) Prior Publication Data

US 2023/0072797 A1 Mar. 9, 2023

(30) Foreign Application Priority Data

Sep. 2, 2021 (IT) ........................ 102021000022739

(51) Int. Cl.
*B65G 1/137* (2006.01)
*B65G 1/04* (2006.01)

(52) U.S. Cl.
CPC ......... *B65G 1/1375* (2013.01); *B65G 1/0435* (2013.01)

(58) Field of Classification Search
CPC .... B65G 47/90; B65G 1/0435; B65G 1/1375; B25J 15/0028
See application file for complete search history.

(56) References Cited

U.S. PATENT DOCUMENTS

| | | | | |
|---|---|---|---|---|
| 10,322,505 | B2 * | 6/2019 | Hellenbrand | B25J 15/0213 |
| 2018/0257241 | A1 * | 9/2018 | Claretti | B25J 15/0028 |
| 2021/0229918 | A1 * | 7/2021 | Schmidt-Ellinger | B25J 15/0028 |
| 2022/0193921 | A1 * | 6/2022 | Hellenbrand | B25J 15/0206 |
| 2023/0348206 | A1 * | 11/2023 | Gross | B65G 61/00 |
| 2024/0300791 | A1 * | 9/2024 | Rami | B66F 9/183 |

FOREIGN PATENT DOCUMENTS

| | | | |
|---|---|---|---|
| CA | 3 068 803 | A1 | 1/2019 |
| EP | 2 522 599 | A1 | 11/2012 |
| EP | 3 971 118 | A1 | 3/2022 |

OTHER PUBLICATIONS

Italian Search Report dated May 20, 2022 received in Italian Application No. 2021000022739, together with an English-language abstract.

* cited by examiner

*Primary Examiner* — Kaitlin S Joerger
(74) *Attorney, Agent, or Firm* — Scully, Scott, Murphy & Presser, P.C.

(57) ABSTRACT

An item manipulator for an automated storage unit, comprising a pincer-like grip device preset on a supporting plate for items such as parallelepipedal or cylindrical items. The item manipulator can be for management of supplies of packages of pharmaceutical products in pharmacies or hospitals and other use environments.

5 Claims, 4 Drawing Sheets

ITEM MANIPULATOR

BACKGROUND OF THE INVENTION

(1) Field of the Invention

The present invention relates to an item manipulator for moving items, particularly substantially parallelepipedal or cylindrical bodies in an automated storage unit.

The invention is applicable in the field of automated storage units for the management of supplies of packages of pharmaceutical products and/or the like.

(2) Description of Related Art

Currently it is known to use robotized storage units for the management of packages of pharmaceutical products in pharmacies or hospitals.

These storage units normally comprise a set of shelves with channels which are inclined like a chute with respect to the horizontal plane and in which the packages of the pharmaceutical products are stored by a manipulator.

The packages indicated by the operator are automatically expelled on demand from said channels.

In order to resupply the inclined channels, the manipulator picks up the packages from a conveyor belt or from storage shelves, known as low product rotation shelves, and introduces them in the channels of the set of shelves or unloads them into the adapted chute for direct picking by the operator.

The manipulator is moved by translation means which place it at the conveyor belt, at the storage shelves or at the inclined channels.

Manipulators are currently known and widespread which rotate with respect to a vertical axis in order to be oriented so as to face alternatively:

- the storage shelves or the conveyor belt, from which to grip the packages,
- or the channels into which the gripped packages are to be unloaded.

One requirement that currently is particularly felt in the field of robotized storage units is to ensure effective grip or grasp of the packages for their movement by the manipulator.

Usually, for the grasp of the packages, the manipulator is provided with a pincer-like device.

Such pincer-like device is generally preset on a supporting plate for the packages to be moved, which in turn is supported by a manipulator movement assembly.

The pincer-like device comprises:

- two mutually opposite grip blades, which are constituted by flat bars arranged substantially at right angles to the arrangement of the supporting plate,
- first means for the translation of the blades in a first direction, defined as the direction toward a facing conveyor belt or a storage shelf,
- second means for the translation of the blades in a second direction, defined as the direction that is perpendicular to the first direction, for the mutual approach of the blades to grip one or more packages and for their mutual spacing for the release of the packages once loaded or unloaded from the supporting plate.

The blades have such a length that they can be inserted between two rows of packages on a shelf for a depth that corresponds to the depth of said shelf, generally on the order of a few tens of centimeters, so as to ensure the grip of the package placed on the shelf in the region furthest from the supporting plate of the manipulator.

For example, the manipulator described in Italian patent no. 1405428 is known in which the means for the mutual approach of the blades to grip a package comprise an electric motor which causes the advancement of a screw to the end of which a lever is connected from which a shaft extends at right angles to the axis of extension of the lever, the shaft being connected to and integral with one end of the grip blades.

The lever is hinged on a pivot which is coaxial with the shaft.

The screw, by advancing, pushes the lever and makes it rotate about the pivot, consequently also rotating the shaft.

Such shaft, by rotating, moves the blade that is integral therewith, closing the pincer.

Furthermore, there is a return spring for reopening the pincer by making the blade return to the initial position.

This manipulator has been a great success, but of course improvements are sought as time goes by.

These improvements are aimed at enhancing aspects that can be improved of this background art and of other manipulators of the known type.

First of all, the friction generated during the advancement of the screw in some circumstances may entail rapid wear of the screw itself, gradually reducing its thread, which at the same time causes the failure of the screw at a moment in time that is difficult to predict.

Furthermore, in this manipulator the screw, by moving, might leave the correct work position, requiring an on-site maintenance intervention of qualified technical personnel to restore the correct position, with consequent considerable downtimes of the machine and of the corresponding apparatus.

Still further, in such a manipulator it is not possible to have control of the movement of the blade during the opening of the pincer, determined by the action of the return spring, and this may cause failures both of the blade, and therefore of said pincer, and of the packages.

Furthermore, for optimum use of the pincer, and therefore manipulation of the packages, the two blades must be as parallel as possible, but this is not always ensured, since in manipulators of the known type it is not possible to detect/manage the angle between the blades in the various positions of advancement in the first direction, i.e., the one toward the facing conveyor belt or the storage shelf.

Finally, in manipulators of the known type it is necessary to know/set beforehand data related to the shape, dimensions and weight of the packages to be manipulated, in order to be able to determine the correct grip force that is required by the pincer for gripping, and this leads to the inconvenience of having to perform measurements during the testing of the manipulator and/or of having to set the motor to impart the necessary force to the movable blade.

BRIEF SUMMARY OF THE INVENTION

The aim of the present invention is to provide an item manipulator that is capable of improving the background art in one or more of the aspects indicated above.

Within this aim, an object of the invention is to provide an item manipulator in which less friction and therefore less wear are caused during the motion of the movable blade, ensuring a longer life of the pincer with respect to manipulators of the known type.

Another object of the invention is to provide an item manipulator in which it is possible to control the return of the blade to the initial position during the opening of the pincer.

A further object of the invention is to provide an item manipulator in which it is possible to detect/manage the angle between the blades in any position of advancement in the direction toward the facing conveyor belt or the storage shelf.

Another object of the invention is to provide an item manipulator that does not make it necessary to know/set beforehand data related to the shape, dimensions and weight of the packages to be manipulated, in order to be able to determine the correct grasping force that is required by the pincer for grip.

A further object of the present invention is to overcome the drawbacks of the background art in a manner that is alternative to any existing solutions.

Not the least object of the invention is to provide an item manipulator that is highly reliable, relatively easy to provide and at competitive costs.

This aim, as well as these and other objects which will become more apparent hereinafter, are achieved by an item manipulator for an automated storage unit, comprising a pincer-like grip device preset on a supporting plate for said items, said pincer-like device comprising:

- two opposite longitudinal grip blades, of which one can move with respect to the other, respectively a first blade and a second blade,
- first means for the translation of said blades in a first direction which is parallel to the direction of extension of said blades,
- second means for translation in a second direction which is perpendicular to said first direction and lies on a plane that is parallel to the plane of arrangement of said plate,
- said manipulator being characterized in that it comprises means for the controlled mutual approach/spacing of said blades.

Further characteristics and advantages of the invention will become more apparent from the description of a preferred but not exclusive embodiment of the manipulator according to the invention, illustrated by way of non-limiting example in the accompanying drawings, wherein:

DETAILED DESCRIPTION OF THE INVENTION

Figure 1:
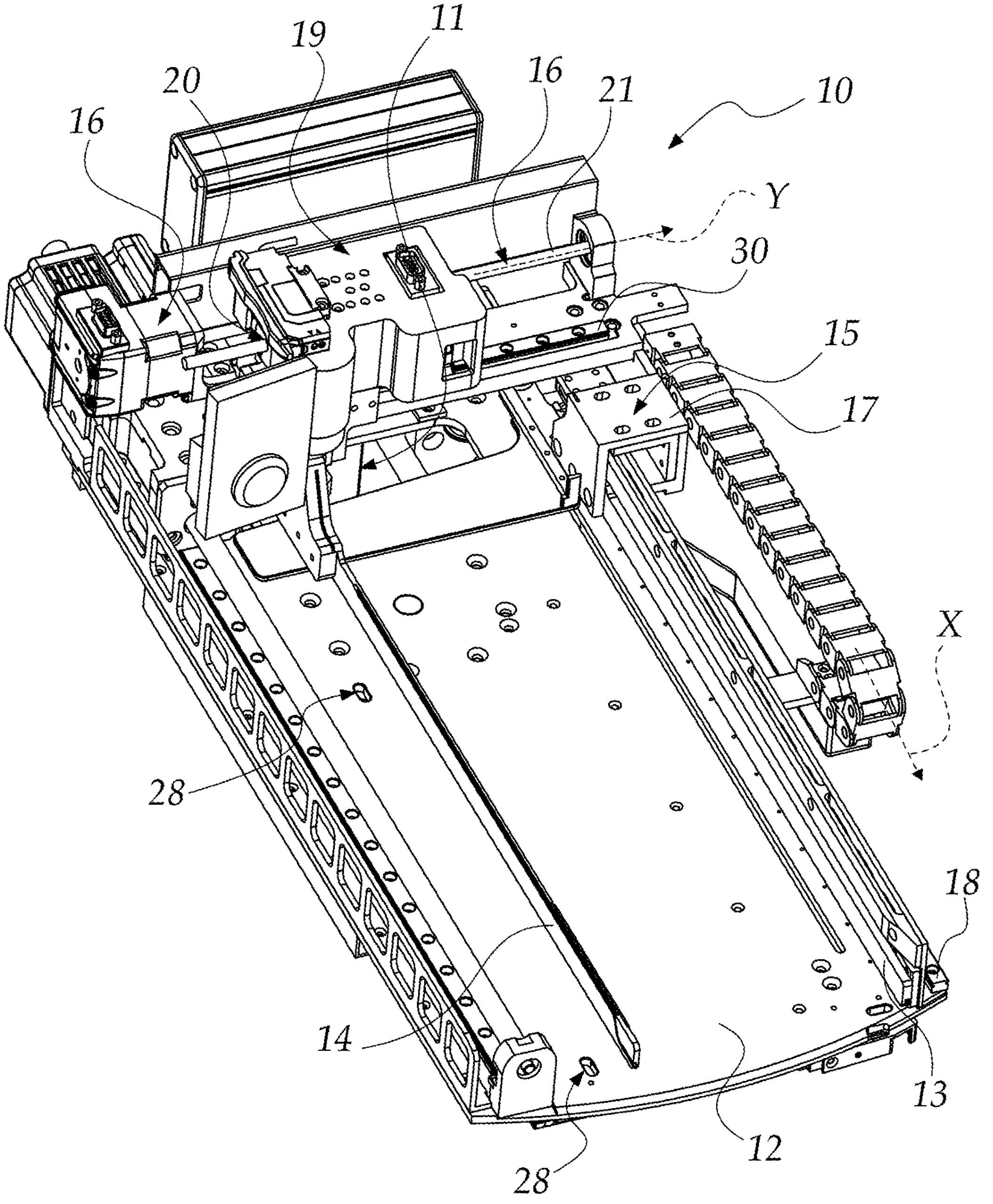
FIG. 1 is a partial perspective view of a manipulator according to the invention in a first configuration.
Figure 2:
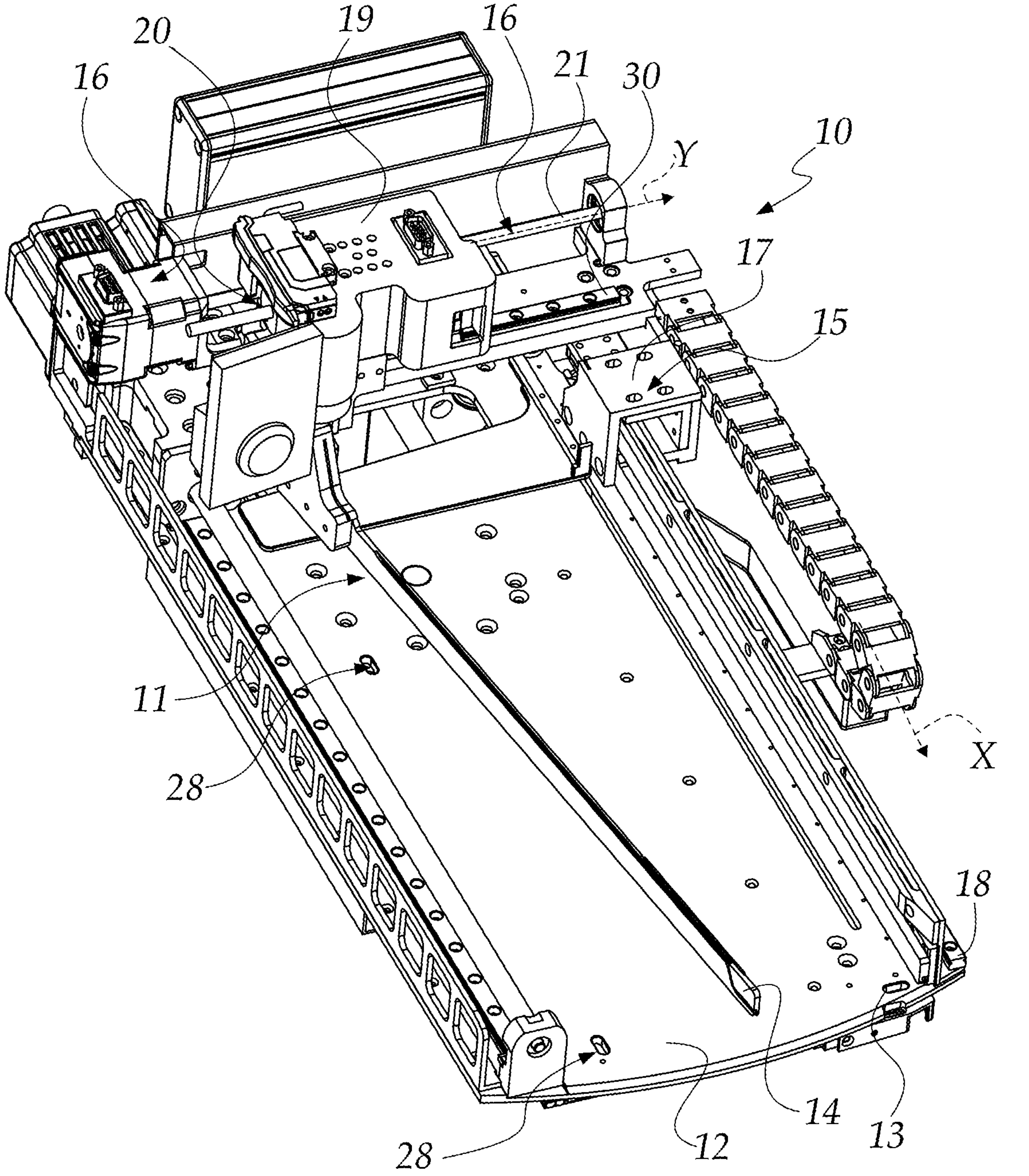
FIG. 2 is a partial perspective view of the manipulator of FIG. 1 in a second configuration.

With reference to the figures, an item manipulator according to the invention is designated generally by the reference numeral 10.

The manipulator 10 can be used in automated storage units for the manipulation of items particularly but not exclusively of the type of pharmaceutical products or medical products.

The manipulator 10 comprises a pincer-like grip device 11 which is preset on a supporting plate 12 for said items, which are not shown in the figures.

Such pincer-like grip device 11 comprises:

- two opposite longitudinal grip blades, of which one can move with respect to another, respectively a first blade 13 and a second blade 14,
- first means 15, shown only partially, for the translation of the blades 13 and 14 in a first direction X which is parallel to the direction of extension of said blades 13, 14,
- second means 16 for translation in a second direction Y, which is perpendicular to the first direction X and lies on a plane that is parallel to the plane of arrangement of the plate 12.

One of the particularities of the invention resides in that the manipulator 10 comprises means 20 for the controlled mutual approach/spacing of the blades 13, 14 for the grip of one or more items.

The term "controlled", in the present description, is understood to mean that the means 20 make it possible to control/adjust the approach or spacing motion of the blades 13, 14 at least as regards the speed.

The first translation means 15 are of a type known per se, constituted for example by two mutually opposite lateral sliders 17, of which only one is shown in the figures, joined by a transverse element, designed to translate on corresponding lateral guides 18 which are extended in a parallel manner on two opposite longitudinal sides of the plate 12.

Means for movement in the first direction X, which are not shown in the figures, such as a recirculating ballscrew guide with a motorized belt, are associated with one of the lateral guides 18.

The second translation means 16 are formed by a slider 19, to which the second blade 14 and the means 20 for the controlled mutual approach/spacing of the blades 13, 14 are coupled, the slider 19 being arranged so as to slide on a translation screw 21 and a guide 30, which is transverse to the lateral guides 18, said screw 21 being moved by an electric motor, not shown in the figures.

Figure 3:
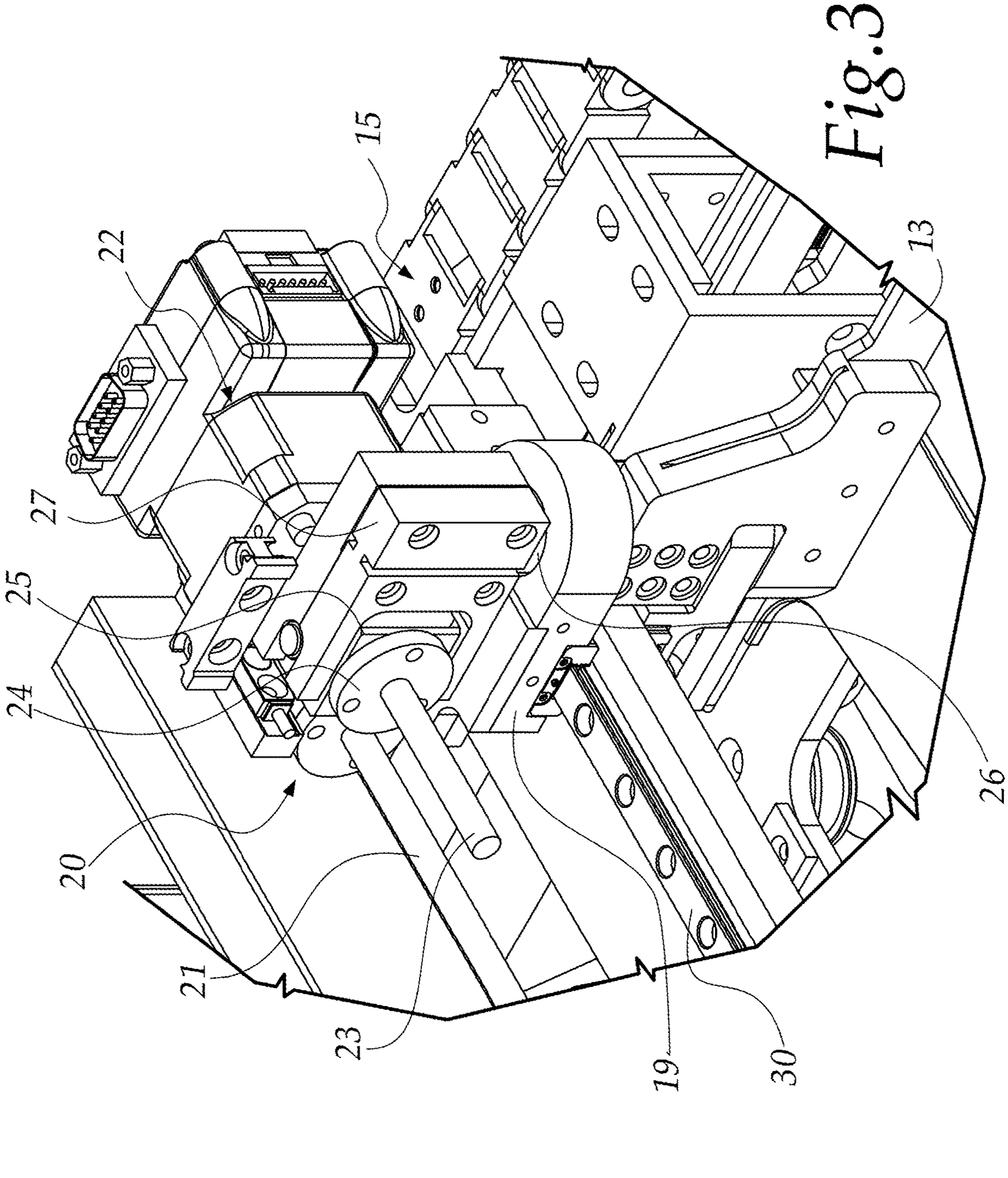
FIG. 3 is an enlarged-scale detail view of a portion of the manipulator of FIG. 1.
Figure 4:
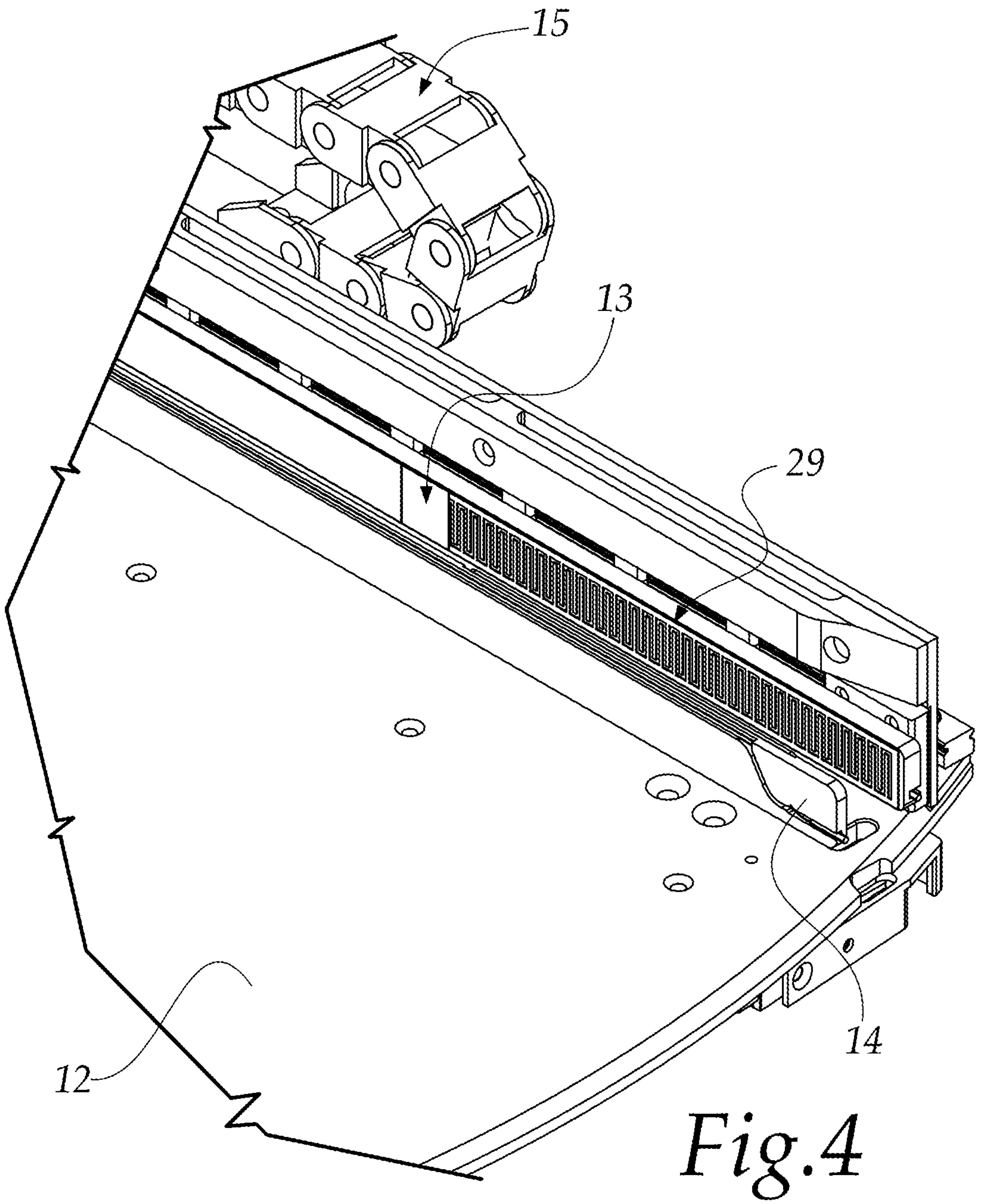
FIG. 4 is another enlarged-scale detail view of a portion of the manipulator of FIG. 1.

In particular, with reference to FIG. 3, the means 20 for the controlled mutual approach/spacing of the blades 13, 14 extend from the slider 19 and comprise:

- an electric motor 22,
- a screw 23, which is parallel to the translation screw 21 and is moved by said motor 22,
- a lead screw 24, which can slide on said screw 23 as an effect of the rotation thereof and is integral with a block 25,
- the block 25, to which a lever 27 is hinged,
- the lever 27, in turn hinged to the slider 19, by means of a shaft/pivot 26,
- the shaft/pivot 26 with an axis of extension that is perpendicular to the plane of arrangement of the plate 12, which is fixed to/integral with one end of the second blade 14 and the lever 27.

The operation of the means 20 for the controlled mutual approach/spacing of the blades 13, 14 is as follows.

The screw 23, by rotating, causes the advancement of the lead screw 24, which is fixed rigidly to the block 25, which by sliding in a linear manner causes the rotation of the lever 27 that is hinged thereto.

The shaft 26, rigidly fixed to the lever 27, by rotating moves the second blade 14 closer to or away from the first blade 13, closing or opening the pincer.

The lever 27 is constituted by two plates which are coupled in order to allow easy and quick assembly and maintenance.

It should be noted that the means 20 for the controlled mutual approach/spacing of the blades 13, 14, differently from what occurs in manipulators of the known type, allow control of the movement of the second blade 14:

both during the closure of the pincer, by making the lead screw 24 advance on the screw 23, and during the opening of the pincer, by making the lead screw 24 move backward on the screw 23.

In this manner it is possible to have complete control of the inclination position of the second blade 14, which is movable, the movement being totally servo-assisted in both directions.

Furthermore, the screw 23 rotates about its own axis of extension, but without translating along it, and this allows a longer life of the screw with respect to similar manipulators with a translating screw.

Moreover, in this manner less friction and therefore less wear is produced during the motion of the movable blade, ensuring a longer life of the pincer with respect to manipulators of the known type.

Another one of the particularities of the manipulator 10 resides in that it comprises optical means for the continuous detection of the alignment between the first blade 13 and the second blade 14.

The optical means are for example two optical sensors 28, arranged on the plate 12, which make it possible to determine in each instant the angle of the second blade 14 with respect to the first blade 13 and the correct parallel arrangement at any instant between the blades 13, 14.

This allows driving the motor 22 in both directions, according to the requirements, in order to angle easily and quickly the second blade 14 with respect to the first blade 13 and achieve the correct mutual parallel arrangement that is required for an effective use of the pincer-like device 11.

Another particularity of the invention resides in that the first blade 13 has a pressure sensor 29.

Such pressure sensor 29 is for example a longitudinally extended transducer, arranged on the surface of the first blade 13 that is directed toward the second blade 14.

Such transducer is adhesive, and has an electrical resistance that is variable as a function of the pressure applied thereto, and therefore a different electrical output signal.

The sensor 29 has a dynamic resistance that is correlated to the quantity of force that is applied.

The variation in electrical resistance is inversely proportional to the applied force and it is therefore possible, with such a sensor 29, to detect the correct force to be applied to the item to be manipulated, for an effective grasp in relation to the factors of weight, shape, material, frictions of the sliding shelves, etc.

Furthermore, the use of the sensor 29 makes it possible to avoid using an excessive pressure force for grasping, avoiding deformations of the products to be manipulated and the consequent degradation and breakages thereof.

Moreover, with the use of the sensor 29 the prior acquisition of data of the items to be manipulated, such as: dimensions, shape, weight, material, surface frictions of the materials of the shelves for storage, etc., is no longer required to set up the operation of the manipulator.

Finally, the use of such a sensor 29 for the manipulator 10 can be implemented with vision systems applied to robotics for the acquisition of further positional information on the storage shelf, grasping and correct pressure, and this makes it possible to avoid being based exclusively on the information detected by the vision systems and associated measurement sensors normally of the optical type (measurement laser) or of the acoustic type (ultrasound sensors).

In practice it has been found that the invention achieves the intended aim and objects, providing a manipulator in which less friction and therefore less wear are produced during the motion of the movable blade, ensuring a longer life of the pincer with respect to manipulators of the known type.

The invention provides a manipulator in which it is possible to control the return of the blade to the initial position during the opening of the pincer.

Furthermore, by means of the invention a manipulator has been provided in which it is possible to detect/manage the angle between the blades in any advancement position in the direction toward the facing conveyor belt or the storage shelf.

Moreover, the invention provides a manipulator that does not require knowing/setting beforehand data related to the shape, dimensions and weight of the packages to be manipulated, in order to be able to determine the correct grasping force that is required of the pincer for grip.

The invention thus conceived is susceptible of numerous modifications and variations, all of which are within the scope of the appended claims; all the details may furthermore be replaced with other technically equivalent elements.

In practice, the materials used, as long as they are compatible with the specific use, as well as the contingent shapes and dimensions, may be any according to the requirements and the state of the art.

The disclosures in Italian Patent Application No. 102021000022739 from which this application claims priority are incorporated herein by reference.

What is claimed is:

1. An item manipulator for an automated storage unit, comprising a pincer-like grip device preset on a supporting plate for items, said pincer-like device comprising:

two opposite longitudinal grip blades, of which one can move with respect to another, respectively a first blade and a second blade, a first assembly for translation of said blades in a first direction which is parallel to a direction of extension of said blades wherein said first translation assembly is constituted by two mutually opposite lateral sliders joined by a transverse element and designed to translate on corresponding lateral guides, said lateral guides being extended in a parallel manner on two opposite longitudinal sides of said plate, a mechanism for movement in said first direction being associated with one of said lateral guides, a second assembly for translation in a second direction which is perpendicular to said first direction and lies on a plane that is parallel to a plane of arrangement of said plate wherein said second translation assembly is formed by a slider to which said second blade and said assembly for the mutual approach/spacing of said blades is coupled, said slider being able to slide on a translation screw and a guide, said guide being transverse to said lateral guides, said translation screw being moved by an electric motor, wherein said manipulator comprises an assembly for controlled mutual approach/spacing of said blades wherein said assembly for the controlled mutual approach/spacing of said blades extend from said slider and comprise:

an electric motor, a screw, which is parallel to said translation screw and is moved by said motor, a lead screw, which can slide on said screw and is integral with a block, said block, a lever being hinged to said block, said lever in turn being hinged to said slider by a shaft/pivot assembly, said shaft/pivot assembly, with an axis of extension that is perpendicular to the plane of arrangement of said plate, said shaft/pivot being fixed to/integral with one end of said second blade and with said lever.

2. The manipulator according to claim 1, further comprising an optical assembly for continuous detection of the alignment between said first blade and said second blade.

3. The manipulator according to claim 2, wherein said optical assembly comprises two optical sensors arranged on said plate.

4. The manipulator according to claim 1, wherein said first blade has a pressure sensor.

5. The manipulator according to claim 4, wherein said pressure sensor is a longitudinally extended transducer arranged on the surface of said first blade that is directed toward said second blade.

* * * * *